US009222790B2

(12) United States Patent
Peplin et al.

(10) Patent No.: US 9,222,790 B2
(45) Date of Patent: Dec. 29, 2015

(54) METHOD AND APPARATUS FOR CROWDSOURCED TOUR CREATION AND PROVISION

(75) Inventors: Christopher Peplin, Ann Arbor, MI (US); Krishnaswamy Venkatesh Prasad, Ann Arbor, MI (US); Thomas J. Giuli, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 421 days.

(21) Appl. No.: 13/547,293

(22) Filed: Jul. 12, 2012

(65) Prior Publication Data

US 2014/0019004 A1    Jan. 16, 2014

(51) Int. Cl.
*G06F 7/00* (2006.01)
*G01C 21/34* (2006.01)

(52) U.S. Cl.
CPC .................... *G01C 21/343* (2013.01)

(58) Field of Classification Search
None
See application file for complete search history.

(56) References Cited

U.S. PATENT DOCUMENTS

| 5,767,795 | A | 6/1998 | Schaphorst |
| 7,003,443 | B2 | 2/2006 | Ford et al. |
| 7,174,173 | B1 * | 2/2007 | Needham et al. .......... 455/456.2 |
| 2002/0011951 | A1 | 1/2002 | Pepin et al. |
| 2004/0032649 | A1 * | 2/2004 | Kondo et al. ................. 359/364 |
| 2004/0039632 | A1 * | 2/2004 | Han et al. ......................... 705/13 |
| 2004/0160512 | A1 * | 8/2004 | Lee et al. ......................... 348/42 |
| 2008/0162042 | A1 | 7/2008 | Huber et al. |
| 2008/0170755 | A1 * | 7/2008 | Nasser et al. ................. 382/106 |
| 2008/0183385 | A1 | 7/2008 | Horn |
| 2013/0302758 | A1 * | 11/2013 | Wright ............................ 434/65 |

OTHER PUBLICATIONS

OGGtours: Opensource Guides to the Globe, Idea—Cambrian House, http://cambrianhouse.com/idea/idea-promotor/ideas-id/HjMuqR2/, pp. 1-19, Dec. 1, 2011.
Kruse—Your GPS Travel Guide to New Zealand, http://www.krusenz.com, Dec. 1, 2011.
Excursia, Masschallenge, MC Mass Challenge, http://masschallenge.org/profile/team/excursia, Dec. 1, 2011.
South African Car Rental, Business—GPS Audio Tours, http://europcarinfo.ca.za/index/php?option=com_content&task=view&id, Dec. 1, 2011.

* cited by examiner

*Primary Examiner* — Adam Alharbi
(74) *Attorney, Agent, or Firm* — Jennifer M. Stec; Brooks Kushman P.C.

(57) ABSTRACT

A system includes a processor, configured to communicate with a vehicle camera, a vehicle audio input and at least one vehicle input control. In this embodiment, the processor is configured to receive a request to being recording user audio from the audio input. The processor is also configured to record user audio and GPS coordinates to be associated with the audio and record one or more images or video files from the vehicle camera, to be associated with the audio or the GPS coordinates. Further, the processor is configured to compile and save the audio input, GPS coordinates and one or more images as a tour data file.

19 Claims, 5 Drawing Sheets

METHOD AND APPARATUS FOR CROWDSOURCED TOUR CREATION AND PROVISION

TECHNICAL FIELD

The illustrative embodiments generally relate to a method and apparatus for crowsourced tour creation and provision.

BACKGROUND

The open-sourcing of the platforms for many operating systems, on both mobile devices and PCs, has encouraged the creation of numerous applications for use by owners of both. Additionally, due to the largely connected nature of all these devices, through, for example, the Internet, willing participants can engage in the provision of data on a massive scale, such that by using the crowd, data on behaviors, environments, localities, etc. can be obtained in a swift and comprehensive manner. Crowd-sourced data also has another use, which relates to the willingness of one person to help another. For example, online product reviews are an example of this type of crowd-sourcing, where a potentially unknown entity voluntarily creates information usable by another purchaser of a product.

Several attempts have been made to provide tours for use by automobile drivers, these examples include U.S. Pat. No. 5,767,795, which generally relates to an electronic tour guide. The system includes a GPS receiver, a computer, and a database of pre-recorded information. These components may be contained in one housing, and may be permanently installed in a vehicle. The database contains information pertaining to various geographical regions. The computer receives a signal from the GPS indicating the position of the vehicle. The computer then retrieves information from the database, the retrieved information corresponding to the position determined by the GPS receiver. The information is presented to the traveler, either on a video display or through an audio playback unit. The system can therefore provide information on the history, geography, and/or culture, relating to the region through which the vehicle is traveling. The information can be modified to include specific reference to points of interest with respect to the instantaneous position and orientation of the vehicle.

Another example is found in US 2008/0162042. This application relates to an improved guidance system and method, providing a packaged tour object having tour directions and media related to points of interest of a tour for playing via a telematics unit. A user is provided, via their telematics unit, with specific directions to access points of interest of the tour in a certain sequence, while the telematics unit optionally conveys media content to the user at appropriate points. The media content may be keyed to an upcoming site, and may comprise audio and/or visual information. In addition, user convenience information such as parking and ticketing information may be contained in the packaged tour object for presentation via the telematics unit.

These are just a few examples of existing audio tour information. There is great potential, however, to utilize social resources to provide an increased supply and variety of tours.

SUMMARY

In a first illustrative embodiment, a system includes a processor, configured to communicate with a vehicle camera, a vehicle audio input and at least one vehicle input control. In this embodiment, the processor is configured to receive a request to being recording user audio from the audio input. The processor is also configured to record user audio and GPS coordinates to be associated with the audio and record one or more images or video files from the vehicle camera, to be associated with the audio or the GPS coordinates. Further, the processor is configured to compile and save the audio input, GPS coordinates and one or more images as a tour data file.

In a second illustrative embodiment, a tangible computer readable storage medium, contains instructions that, when executed by a processor of a vehicle computing system, causes the vehicle computing system to perform the process including receiving a request to being recording user audio from an audio input. The process also includes recording user audio and GPS coordinates to be associated with the audio. Further, the illustrative process includes recording one or more images or video files from the vehicle camera, to be associated with the audio or the GPS coordinates. Also, the process includes compiling and saving the audio input, GPS coordinates and one or more images as a tour data file.

In a third illustrative example, a computer-implemented method includes receiving a request to being recording user audio from an audio input. Also, the method includes recording user audio and GPS coordinates to be associated with the audio. The illustrative method further includes recording one or more images or video files from the vehicle camera, to be associated with the audio or the GPS coordinates. Additionally, the exemplary method includes compiling and saving the audio input, GPS coordinates and one or more images as a tour data file.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
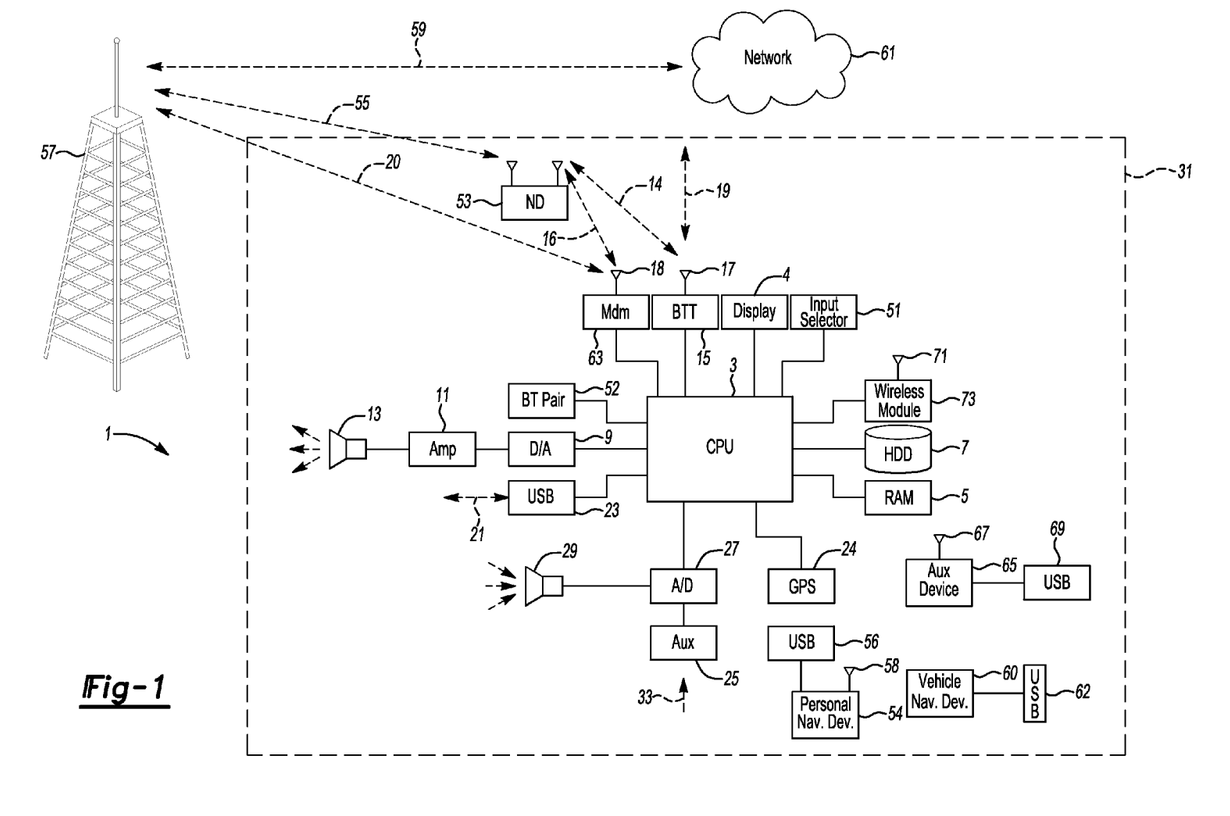
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Tourism is a massive industry, and millions of people travel to spots all around the world every year to view famous monuments, architecture, sites, etc. Thousands of travel guides have been written on commonly attended areas, and these guides are often very comprehensive in nature.

That said, there are often many, many little details about local culture that are not covered by travel guides, even in heavily traveled areas. For example, certain restaurants may boast the best views of sights, have particularly authentic local dishes, and may, like other "secondary" attractions in the area, have historic import associated with them.

Locals and business owners may often know these facts, but may lack the resources or forum to provide this information to tourists. Additionally, there are literally thousands of spots across the world that may have interesting local features that are desirable for tourist viewing and information, but given their relative obscurity, no literature has been published on the areas. Again, locals are often the best source of information on these topics, but few locals have the time or resources to write a travel guide on their particular locality.

The illustrative embodiments envision a crowd-sourced tour database where anyone with access to a properly equipped vehicle can create and provide guided tours on any area of the user's choosing. Using video cameras, photo cameras and other vehicle data inputs, a user can drive through an area, record images of the area, record audio corresponding to the area, and complete and upload a tour accessible by other vehicle computing system users.

Once a tour has been created, drivers traveling through a locale for which a tour exists can download the tour and receive a guided tour provided by someone with (hopefully) advanced knowledge of the area. Tours can be rated and ranked, and tour guide names can be associated with tours, so better guides and tours can be more readily accessed for drivers who enjoy a particular tour or guide. These tours can assist with tourism, people moving to a new area, or just help break up the monotony of driving.

Figure 2:
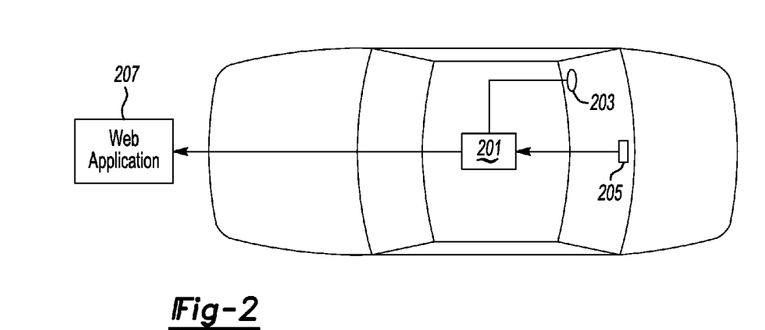
FIG. 2 shows an illustrative example of a system for practicing the illustrative embodiments.

FIG. 2 shows an illustrative example of a system for practicing the illustrative embodiments. In this illustrative example, a vehicle is equipped with at least one camera capable of recording video or photo images. For example, in the system shown, there is a front-facing camera mounted behind a rear-view mirror 3, that can provide photo/video shots similar to what the driver is currently seeing. Other cameras can also be provided that can take photo or video shots.

In at least one embodiment, the process can display pictures that are being taken or that are proposed. If multiple cameras are present, a variety of possible shots may be shown. It may also be the case that, if a vehicle is traveling over a certain speed, or traveling at all, or other factors that may require the driver's attention to be focused on the road, the process does not show exemplary pictures so as not to distract a driver. In still another embodiment, a screen not presented to the driver (such as, for example, a rear display) provides images, so that an occupant other than the driver can select particular shots.

In this example, the driver may have the ability to use inputs provided on a steering wheel 2 to select shots. Since the camera can more-or-less see what the driver is seeing, the shot selection can be made without resorting to viewing the images on a digital display. The driver can simply wait until the view through the windshield is appropriate, and then request a photo. Additionally or alternatively, the process can snap photos at intervals while the tour is being recorded. Other possible alternatives and additives to the photo-taking process will be described herein, as non-limiting examples.

In addition to controls for a camera, the steering wheel controls may be used to start and stop audio recording. Audio recording can be made possible through use of an in-vehicle microphone, which can be controlled through the steering wheel controls, or other occupant accessible controls. Recorded data, both audio and visual, can be sent to a vehicle computing system 201 for compilation and processing. Using a connection established through a wireless device, such as a cellular phone, the vehicle computing system can interact with a web-based application (or other remote application) for obtaining tour information and uploading created audio tours.

Figure 3:
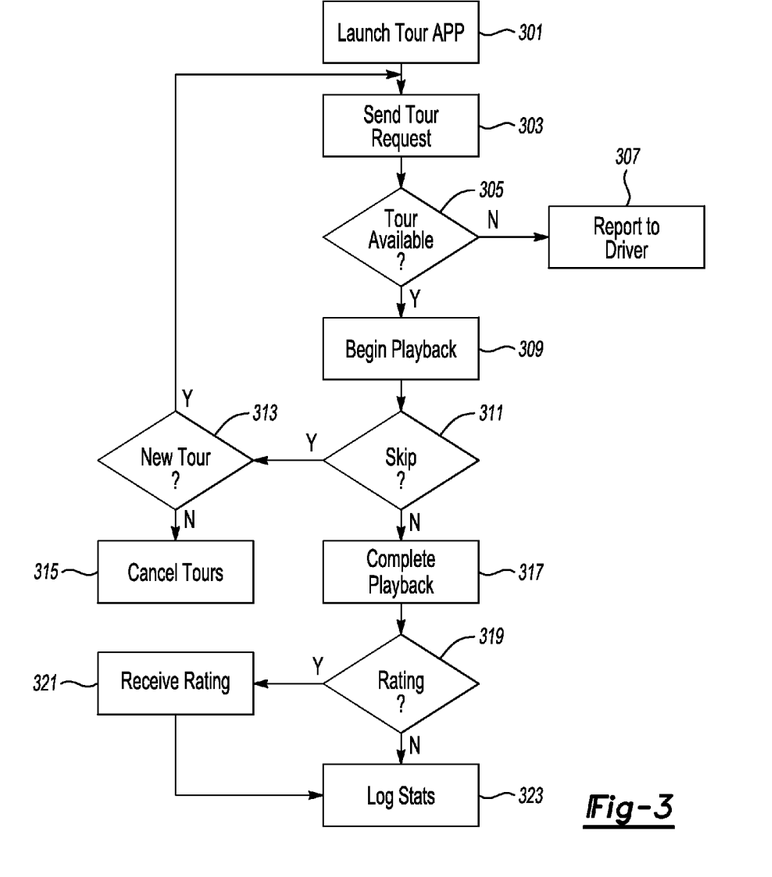
FIG. 3 shows an illustrative example of a tour presentation process.

FIG. 3 shows an illustrative example of a tour presentation process. In this illustrative example, a driver may wish to access a pre-recorded audio tour. The audio tours may be accessible, for example, from the cloud, a remote server, etc. The driver may specifically request a tour, or, in another example, a vehicle may periodically broadcast GPS coordinates to a remote location to see if any tours are available. In still another example, when a route is planned, tours associated with points along a route may be provided as options to a driver as the points are approached, displayed on a nav display as, for example, icons, etc.

In this example, a tour retrieval and display application is first launched 301. The application, once activated, sends a request to the remote server or cloud-based site, asking for tour information 303. As previously noted, the process may include information with the request, including vehicle GPS location information.

The request may also include, for example, preferred tour guides, previously enjoyed tour information, driver profile information, vehicle context, etc. This information may be used by the remote tour providing server to select an appropriate tour for delivery to the vehicle.

The process will then be notified if a tour is available. Since many areas may not have tours, especially once the system is first implemented, it is possible that no tour is available. In this case, the process will report to the driver that no tour is available 307. Otherwise, if a tour is available, the process may download/receive the tour data, and begin providing the tour 309. In at least one embodiment, the tour start and/or locations along the tour may be keyed to specific GPS coordinate or a GPS coordinate region. The tour information associated with these points may be reserved for playback until an appropriate vehicle location is reached.

This may be useful, for example, if there is more or less traffic at a time a tour is being played back than there was when a tour was recorded. Playing back the tour as a whole block, while possible and contemplated, may result in timing and viewing of sights being off from when the tour recorder intended the listener to hear/see that information. By linking the information to GPS locations, the process can allow information to be delivered at an appropriate location.

In this embodiment, a user is also given the option to skip over a tour 311. For example, a tour may not have interesting or useful information, or a user may not want to hear the tour for various reasons. Accordingly, in this example, the user is given the option to skip over tours that the user doesn't want to see/hear. Since there may be more than one tour available for a location, the process can give the user an option to hear another available tour 313. If another tour is not available or not selected, the process may cancel tour playback 315.

If the user doesn't elect to skip a tour, the playback will continue until the tour is completed 317. This can correspond to an end of a file, or the user leaving a particular location, etc. At the end of the tour, the user may be given the option to rate the tour, rate the guide, save information relating to the tour, etc 319. If the user elects to perform additional steps at this point, the process can save any received user ratings, preferences, etc. 321.

Even if the user doesn't elect to rate the tour, the process may save certain statistics relating to the tour 323. For example, the process may wish to record how many times a particular tour has been accessed, or accessed fully without skipping, etc. Other statistics, such as, tour completion time, corresponding to time of day, for example, may be recorded. This information may be useful in recommending a tour to people accessing area tours for a first time. Especially if tour information is linked to, for example, GPS data, the recording time of the tour may not be the same as the playback time given variances in traffic. Playback time at varying times of day may be useful for helping determine which tour to provide to a requesting user.

Figure 4:
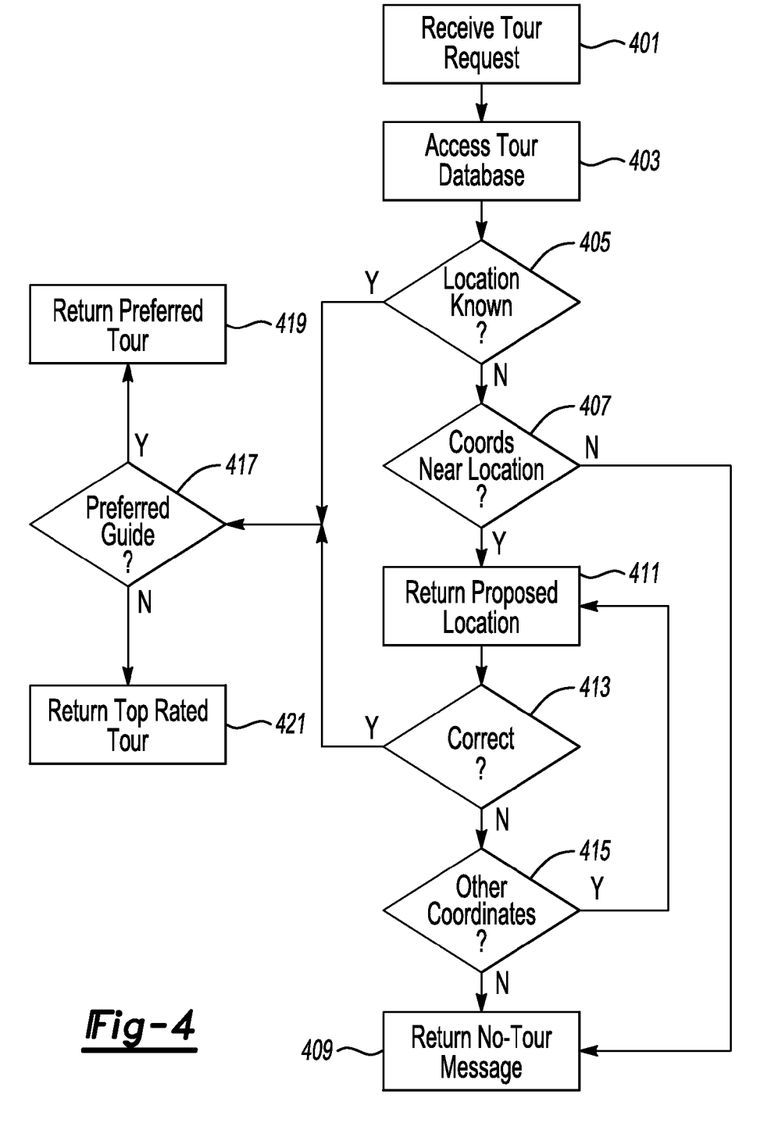
FIG. 4 shows an illustrative example of a tour-request handling process.

FIG. 4 shows an illustrative example of a tour-request handling process. This process, for example, could be a server-side process for handling requests for tour information from a vehicle application. The tour requesting information could also, for example, be running on a wireless device, which may be in communication with a vehicle computing system. In this illustrative embodiment, the process receives a tour request 401. The request can include information, as previously noted, useful for determining which tour to provide to a user.

Once any relevant information has been retrieved from a request for a tour, the process can access a tour database 403. The database can store numerous points of information relating to a tour. It can even be possible, for example, for a narrative from one user to access common or "best" pictures and video from other tours, to combine the best of multiple tours to provide an "optimal" tour.

Since there may or may not be tour information provided for an area, the process may check to see if a current GPS location of the vehicle has any tours associated therewith 405. Since a user may not be in the same location as a tour creator, there may be a proximity associated with a tour start point, in which tours are made available. Additionally, tour start points may be nearby to a user's current location. The process can check both to see if there are any points near a current user location, and/or if the user is currently located within a "start area" of a particular tour 407.

If the user is not near any start points, the process may return a message that no tours are currently available 409. If the user is at a currently known location (i.e., there is a tour currently available, the process may continue to processing the tour request). If the user is not in a "start area", it may be the case that the user is near one or more tour start points 407. If this is the case, the process may return one or more proposed locations for tours. For example, the process could notify the user that a first tour begins at a first location 411, in a first direction, and a second tour begins at a second location 411, in a second direction, etc. If any of these tours are desirable to a user, the user can select the tour and directions to the tour start point can be provided 413.

In this example, the process provides options one at a time, and if the nearest option, for example, the process checks for the next nearest tour 415. This continues until there are no proximate coordinates for tours 415 or until a tour has been selected.

Once a tour has been selected, the process may check to see if there is a preferred guide that the user has selected or enjoyed in the past 417. For example, a tour creator may create more than one tour, and the user may prefer tours created by that person. This could even correspond to professionally recorded tours, if desired.

If there is no preference of the user that defines which tour should be selected, or which tour to first recommend, the process may use one or more user statistics to select a tour. This information can correspond, for example, to information related to a driver, passengers, etc. In another case, the process may select a top rated or top viewed tour as a first tour to recommend 421. Multiple tours can also be recommended and the user can choose from one of them. If the user has a preferred guide/tour provider, etc., the process can select and recommend a tour that corresponds to the preferred tour 419.

Figure 5:
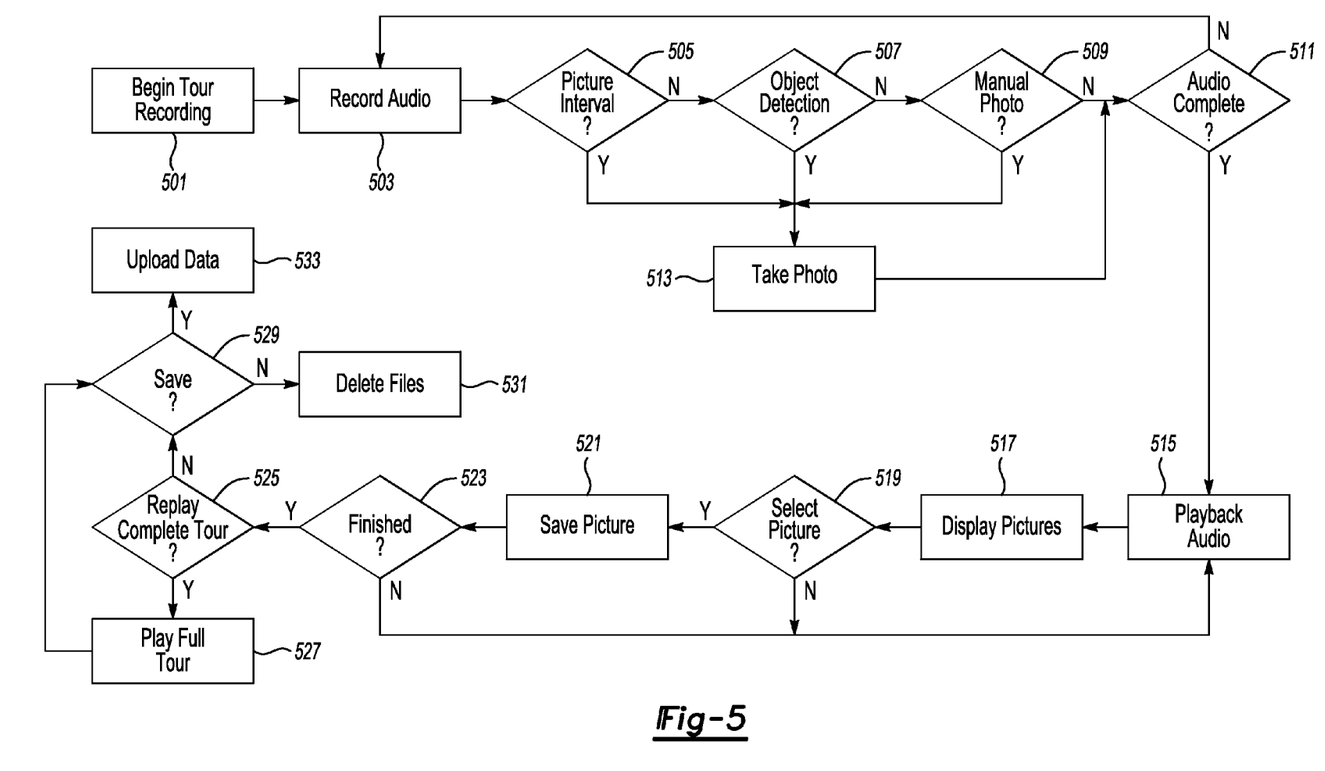
FIG. 5 shows an illustrative example of a tour recording process.

FIG. 5 shows an illustrative example of a tour recording process. This is one example of the crowd-sourced data collection that can provide tour information. In this illustrative example, a user has initiated tour-recording through, for example, launch of an application or another user request. The process begins information recording 501, recording audio 503 as provided by a user through a vehicle input. The user can use system controls, for example, to control stopping or starting of recording as needed throughout the tour.

In addition to recorded audio, tours may have pictures or video associated with them. For example, one or more vehicle cameras may snap pictures at regular intervals throughout a tour, to provide visual data to go along with the audio data. In this example, the process checks to see if an interval has passed 505. The interval can be preset, user determined, etc., and can correspond to the passage of time or distance, or any other suitable measurement. If the interval has passed, the process takes a photo/records the appropriate information, etc. 513.

If the interval has not yet passed, or if there is no interval, the process may also employ some form of object detection designed to either "recognize" points of interest (based on, for example, known photos) or distinguish points of interest from commonly situated surroundings 507. For example, a camera may be able to distinguish between a statue and buildings based on the differences in edge detection between the two, and may elect to snap pictures of the statute assuming it to be a tourist-oriented object. Specific photo recognition techniques known outside the scope of this invention can be used to select objects for capture.

Additionally or alternatively, the process may have manual photography or recording controls enabled 509. For example, a preview of an image could be shown on a vehicle display, and a user could click a control to snap a photo. In another example, the process may not display previews, but a user can still request a manual photo/recording 509 based on a view from a front window, side window, etc., based on where cameras in the vehicle are located.

In any of these instances, whether an interval has passed, an object is detected, a user requests a photo or any other suitable measure of when a photograph should be taken arises, the process may take a photo or record a video 513. This photo taking process can continue assembling image data until an audio recording process is completed 511. In another example, the photo taking process may be suspended while a user suspends recording of audio (for example, when a user takes a manually initiated break from audio recording).

Once the tour creation process has completed, the system may play back the recorded audio 515 and/or any recorded images 517 for user approval. Since this may be distracting, in at least one example the vehicle may need to be in a stopped or parked state for review of the recorded information. Or, in another example, the process may save the tour for user review on a remote source, such as, for example, a PC or other device outside the vehicle.

In the recording portion of the tour creation, in this example, photos and/or video may have been recorded at certain intervals and one or more images may not be usable or suitable due to obstructions, vehicle orientation, etc. Accordingly, in this example, as part of the review process, the user can select specific photos or videos for association or deletion 519. Selected images are then saved as part of the tour 521 for provision to people listening to the tour.

If the user is reviewing the tour on a PC, for example, it may also be possible to associate other images (such as ones taken by a digital camera, outside of the vehicle) with points on the tour. Or, in another example, there may be one or more preferred images available online (in the tour database, for example) especially with respect to commonly created tours. The user may be able to view images taken by others and made publicly available, and associated those images or video with the user's created tour.

Once the review process is finished, the user may be given an option to review an entire completed version of the tour 525. Since the tour may have been reviewed, for example, in a somewhat piecemeal fashion, it may be useful for a user to review the entire tour to determine if the tour was suitably assembled and completed. If the user wishes to view/hear the tour in entirety, the process may play back the full tour 527. If a user desires, this can even be in the form of returning to the start point of the tour, and traveling the route of the tour to hear the tour as it would be played back for a listener.

Once any additional review is completed or skipped, the process may ask the user if the user wants to save the tour 529. If the user elects to save the tour, all relevant data may be uploaded to a tour database 533 and saved for future access. If the user does not elect to save the tour, the process may delete the files associated with the tour 531.

Since GPS data may have been associated with a tour, in order to, for example, provide points at which certain audio may be replayed, it is also possible to create a "route" for the tour which a user can follow. That is, once a tour start point has been reached, the route taken by the tour creator can be recreated from the GPS data for use by a tour listener. In some instances, the tours may just be brief snippets of information associated with a specific GPS location, but in other instances, the tours may be, for example, tours of a route, town, expansive location, etc. In these instances, it may be useful to use the recorded GPS data to recreate a route for the user.

Figure 6:
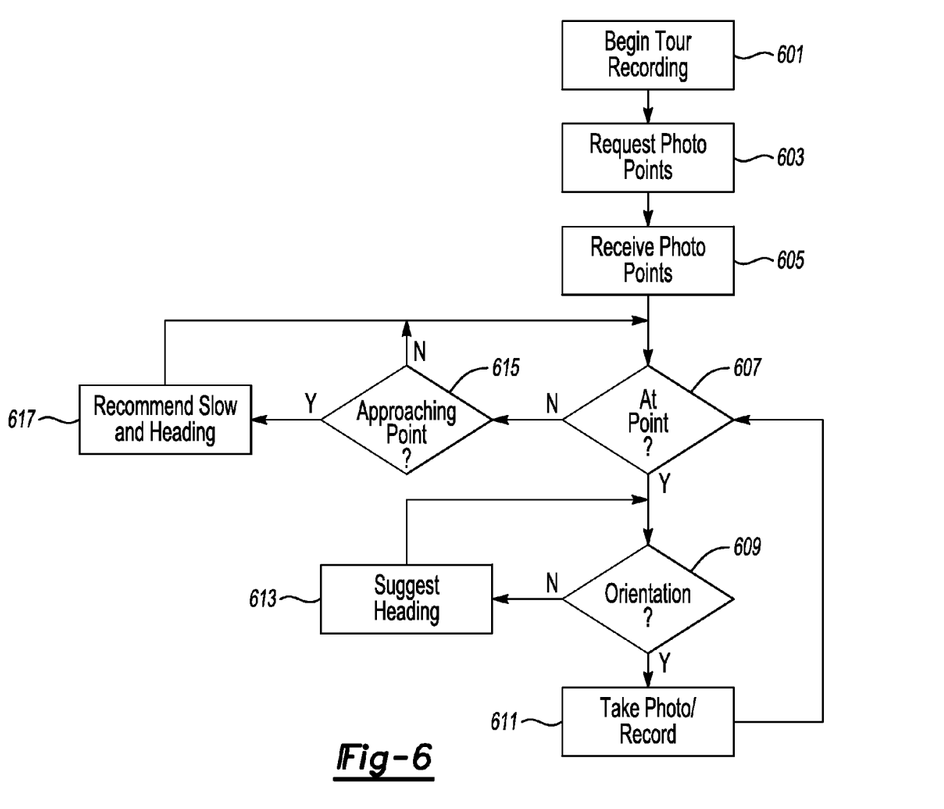
FIG. 6 shows an illustrative example of a photo-taking recommendation process.

FIG. 6 shows an illustrative example of a photo-taking recommendation process. This is merely an exemplary process that may be used to determine when photographs should be taken along a tour. By using an automated photography process, it is possible to remove levels of distraction from a tour creation experience, and allow a driver to focus on the task of driving and providing audio. As noted, manual photography may be possible, but if suitable automated processes can be provided it may be possible to set up scenarios in which manual photography is unnecessary.

The process shown in FIG. 6 can begin when a tour recording process begins 601. In this example, the tour is provided for a location which other users have also recorded tours. The process sends a request to the remote tour database, requesting GPS locations at which other photographs have been taken 603. This information may also include vehicle heading information, vehicle speeds, etc. Assuming that any available data exists, the process receives back one or more GPS points/headings/speeds etc. 605.

Once any data has been received, the process checks to see if the vehicle is currently at a point where a picture should be taken 607. If the vehicle is currently at (or near) a suitable point, based on obtained data, the process may also check to see if the vehicle orientation (and/or speed, etc.) is proper 609 based on the recommended photo data. If the heading, speed, or other vehicle data doesn't match, the process may suggest a reorientation of the vehicle, slow-down of the vehicle, etc. to obtain the appropriate picture 613.

If all of the data is suitable, the process may take one or more pictures 611 or record video as appropriate. This may continue until data points are no longer available, until a tour ends, etc. If the user is not currently at a designated point, the process may consider whether or not a user is approaching a current point for photography 615. If this is the case, the process may recommend, for example, a speed, heading or other change in driving style 617. In another embodiment, a photo point may be nearby, but the user may drive past or not be headed towards the point. In such a case, the process may recommend to a user that the user re-reroute the vehicle to the point so that a purportedly optimal picture may be obtained to accompany the tour.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor, configured to:
receive a request to begin recording user audio from a vehicle audio input;
record user audio and GPS coordinates to be associated with the audio;
recognize an object of interest and record an image or video of the object from the vehicle camera, to be associated with the audio and the GPS coordinates; and save the audio input, GPS coordinates and image or video as a tour-data file.

2. The system of claim 1, wherein the processor is further configured to pause and resume recording based on input from a vehicle input control.

3. The system of claim 1, wherein the processor is further configured to take a photograph using the vehicle camera based on input from a vehicle input control.

4. The system of claim 1, wherein the processor is further configured to start and stop video recording based on input from a vehicle input control.

5. The system of claim 1, wherein the processor is further configured to take pictures at periodic intervals using the vehicle camera.

6. The system of claim 1, wherein the processor is configured to take one or more pictures at predetermined locations using the vehicle camera.

7. A tangible computer readable storage medium, containing instructions that, when executed by a processor of a vehicle computing system, causes the vehicle computing system to perform the process comprising:
- receiving a request to begin recording user audio from an audio input;
- recording user audio and GPS coordinates to be associated with the audio;
- recording one or more images or video files from the vehicle camera, to be associated with the audio and the GPS coordinates; and
- compiling and saving the audio input, GPS coordinates and one or more images as a tour data file.

8. The storage medium of claim 7, wherein the process further includes pausing and resuming recording based on input from a vehicle input control.

9. The storage medium of claim 7, wherein the process further includes taking a photograph using the vehicle camera based on input from a vehicle input control.

10. The storage medium of claim 7, wherein the process further includes starting and stopping video recording based on input from a vehicle input control.

11. The storage medium of claim 7, wherein the process further includes taking pictures at periodic intervals using the vehicle camera.

12. The storage medium of claim 7, wherein the process further includes recognizing an object and taking at least one picture of the object using the vehicle camera.

13. The storage medium of claim 7, wherein the process further includes taking one or more pictures at predetermined locations using the vehicle camera.

14. A computer-implemented method comprising:
- receiving a request to begin recording user audio from an audio input;
- recording user audio and GPS coordinates to be associated with the audio;
- recording, at predetermined locations, one or more images or video files from the vehicle camera, to be associated with the audio and the GPS coordinates; and
- compiling and saving the audio input, GPS coordinates and one or more images as a tour data file.

15. The method of claim 14, wherein the method further includes pausing and resuming recording based on input from a vehicle input control.

16. The method of claim 14, wherein the method further includes taking a photograph using the vehicle camera based on input from a vehicle input control.

17. The method of claim 14, wherein the method further includes starting and stopping video recording based on input from a vehicle input control.

18. The method of claim 14, wherein the method includes taking pictures at periodic intervals using the vehicle camera.

19. The method of claim 14, wherein the method includes recognizing an object and taking at least one picture of the object using the vehicle camera.

* * * * *